United States Patent Office 3,386,860
Patented June 4, 1968

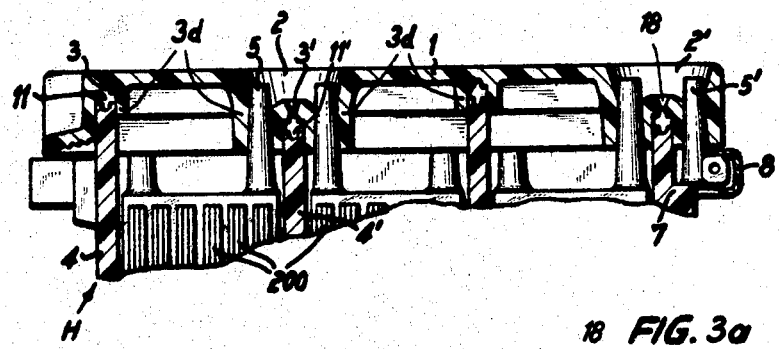

3,386,860
METHOD OF ASSEMBLING STORAGE
BATTERIES
Oskar Maier, Hildesheim-Wald, Germany, assignor to
Robert Bosch G.m.b.H., Stuttgart, Germany
Filed Mar. 16, 1965, Ser. No. 440,248
Claims priority, application Germany, Apr. 11, 1964,
B 76,298
6 Claims. (Cl. 136—176)

ABSTRACT OF THE DISCLOSURE

A multi-cell storage battery is assembled by placing grooves provided in upper edge portions of its thermoplastic housing into spaced registry with grooves in the underside of a thermoplastic apertured cover and simultaneously causing portions of terminals, which are provided in the housing, to extend through the apertures in the cover and into recesses provided in the upper side of the latter. A metallic cell connector is inserted into each recess and welded to the respective terminal. The cover and edge portions are moved into engagement so that the registering grooves form channels. A hardenable liquid material is injected into each channel to form a sealing connection between cover and housing, and a hardenable liquid insulating material is filled into each recess to embed the cell connectors.

The present invention relates to a method of assembling and integrally connecting component parts of structures which consist of weldable synthetic plastic and/or metallic material. More particularly, the invention relates to a method which, among many other useful applications, may be resorted to in assembling prefabricated components of electric storage batteries for automotive vehicles and the like. Still more particularly, the invention relates to a multi-stage method of assembling prefabricated metallic and/or synthetic thermoplastic components into a unitary structure. As a rule, at least some components of the thus obtained structure will consist of polystyrene or other suitable synthetic thermoplastic material.

It is an important object of the present invention to provide a multi-stage method of assembling metallic and/or synthetic thermoplastic components in such a way that at least some such components form a fluid-tight unit and that one group of components may fully or partially conceal the other group after the components of the other group are properly assembled and/or connected with each other.

Another object of the invention is to provide a novel multi-stage method of connecting the terminals and terminal posts of an electric storage battery and of sealingly connecting the cover to the side walls and partitions of the battery housing.

A further object of the invention is to provide a method of the just outlined characteristics according to which the cover and the housing of an electric storage battery may be sealingly secured to each other in a single operation, regardless of the number of cells in the battery and regardless of the exact size and shape of the housing.

An additional object of the invention is to provide a method of the just outlined characteristics according to which the cover of an electric storage battery may be used as a mold during welding of prefabricated cell connectors to the terminals and terminal posts of adjoining cells.

A concomitant object of the invention is to provide a method of assembling the components in several goups which consist of different weldable materials and wherein the components of one group may be welded to or otherwise assembled with each other while the components of the other group or groups assume positions which not only allow for but actually facilitate welding of components in the one group.

Still another object of the instant invention is to provide an improved prefabricated cover and an improved prefabricated housing which may be used in practicing the above outlined method of assembling electric storage batteries.

Briefly stated, one feature of my invention resides in the provision of a multi-stage method of forming permanent connections between prefabricated components in each of at least two groups at least one of which preferably consists of weldable material and according to which the components of one group are connectable to each other while the components of the other group are held in a state of partial assembly. The method comprises the steps of partially assembling the components of the other group, connecting the components of the one group to each other, fully assembling the components of the other group when the connection between the components of the one group hardens or is otherwise completed, and sealingly welding or otherwise bonding or fusing the components of the other group to each other.

When the method is practiced in connection with the final assembly of a multi-cell storage battery whose prefabricated housing and cover consist of synthetic thermoplastic material, the cover is held in a position in which it is slightly displaced from its final position with reference to the housing but is sufficiently close to the housing to afford access to the terminals of adjoining cells. Such terminals are then welded to a prefabricated cell connector and, when the resulting bridge hardens, the cover is moved to its final position and is sealingly fused with the housing by one or more streams of injected liquid thermoplastic material. The abutting edge portions of the cover and housing are preferably formed with registering grooves which are filled with liquid thermoplastic material to form therewith a unitary structure which seals the interior of the storage battery from the atmosphere. At the same time, such liquid plastic material may be used to provide an insulating cap over and around the bridge between the terminals.

The novel features which are considered as characteristic of the invention are set forth in particular in the appended claims. The improved method itself, however, together with additional features and advantages thereof, will be best understood upon perusal of the following detailed description of a specific embodiment with reference to the accompanying drawings, in which:

FIG. 1 is a fragmentary vertical section through a partially assembled multi-cell electric storage battery whose components are about to be welded to each other in accordance with my method;

FIG. 2 is an enlarged fragmentary view of a detail of the structure shown in FIG. 1, further showing a cell connector which is about to be welded to the terminals of two adjoining cells while the cover remains in a position other than its final position with reference to the housing;

FIG. 3 is a similar fragmentary view and illustrates the structure of FIG. 2 following the welding of a cell connector to the corresponding terminals;

FIG. 3a is a top plan view of a portion of the structure shown in FIG. 3;

FIG. 4 is a fragmentary view similar to the views of FIGS. 2 and 3, showing the cover in its final position and a plate-like lid which seals a recess accommodating the cell connector of FIG. 3; and FIG. 5 is a vertical section as seen in the direction of arrows from the line V—V of FIG. 4, further showing the nozzle of an injector which is utilized to admit liquid thermoplastic material into the recesses of the cover and into the channels defined by the grooves in abutting portions of the cover and housing.

Referring to FIG. 1, there is shown a portion of a three-cell electric storage battery of the type which may be utilized in automotive vehicles. The battery comprises a housing H having four upstanding outer walls or side walls 4 and two intermediate walls or partitions 4', and a one-piece cover 1. Both the housing H and cover 1 consist of polystyrene or other weldable synthetic thermoplastic material. Each cell accommodates a set of plates 200, and the terminals 5 of such plates extend upwardly through openings provided in the cover 1. The upper end portions of the terminals 5 extend into recesses 2, 2' provided in the upper side of the cover. FIG. 1 further shows one of the terminal posts 5' which rests on a laterally extending projection 7 of the housing H and may be connected to one end of a cable, not shown. The eye of the terminal post 5' is partially concealed by a plastic casing 8. For the sake of simplicity, the parts 4, 4' will be called walls and the parts 5, 5' will be called terminals.

The underside of the cover 1 is provided with a series of grooves 3, 3' which respectively overlie the upper edge portions of the walls 4 and 4'. The grooves 3 are located opposite similar grooves 11 provided in the upper end faces of the walls 4, and the upper end faces of the walls 4' are formed with grooves 11' located directly opposite the grooves 3'. Thus, even when the lands surrounding the grooves 3, 3' come to rest on the upper end faces of the walls 4 and 4', the grooves 3, 11 and 3', 11' form elongated channels 19, 19' (see FIGS. 4 and 5) which may receive a charge of flowing thermoplastic material.

In the first step, the cover 1 is only partially assembled with the housing H, see FIGS. 1 to 3. Thus, the grooves 3, 3' remain at least slightly spaced from the grooves 11, 11', the space between the top end face of a wall 4' and the underside of the cover 1 being indicated in FIG. 2 by a numeral 17. However, such partial assembling of the cover 1 and housing H suffices to insure that the tips of the terminals 5 and 5' extend into the respective recesses 2, 2'. This is clearly shown in FIG. 2. The operators are now in a position to insert prefabricated cell connectors 9 so that each cell connector extends across the gap between a pair of adjacent terminals. Such cell connectors are then welded to the respective terminals in a manner as shown in FIGS. 3 and 3a. The welding operation is carried out while the cover 1 remains at a level slightly above its final position, i.e., while the underside of the cover still forms with the top end faces of walls 4' a pair of elongated spaces 17. During welding, the surfaces surrounding the recesses 2, 2' serve as mold surfaces whereby the recesses accumulate any such molten metal which might tend to flow along the terminals 5 and 5'. When the welding operation is completed, the cell connectors 9 and the corresponding terminals form a series of metallic bridges 10 one of which is shown in each of FIGS. 2 to 5.

The next welding operation (or, better-to-say, sealing and fusing operation) is carried out when the material of the bridges 10 hardens. The cover 1 is then displaced so that the spaces 17 disappear and the underside of the cover comes in actual abutment with the upper end faces of the walls 4 and 4'. Thus, the cover and the housing H then define a series of channels 19, 19' shown in FIGS. 4 and 5. Furthermore, the bridges 10 are then located nearer to the upper side of the cover 1 because the recesses 2, 2' descend to a lower level whereby the horizontal web of each bridge 10 is exposed from above and also from below, see particularly FIG. 4. Beneath the horizontal web of each bridge 10, the cover 1 is provided with a tapered inlet port 18 which communicates with the recess 2 or 2' and allows liquid thermoplastic material to penetrate from the channel 19 or 19' and into the respective recess. Prior to admission of liquid thermoplastic material, the upper ends of the recesses 2, 2' are sealed by presser plates or lids 12 which are removed when the sealing operation is completed. During admission of thermoplastic material, the plates 12 are pressed by springs, by a hydraulic or pneumatic fluid or in another suitable way (see the arrow 16 in FIG. 5) to make sure that the material filling the recesses 2,2' is flush with the upper side of the cover 1 and the latter requires no aftertreatment.

The device for injecting thermoplastic material is shown at 13, and the plastic material is indicated at 15. The cover 1 is provided with an inlet 14 which communicates with one of the channels 19, 19', and such channels communicate with each other as shown in FIG. 5. Furthermore, the channels 19, 19' also communicate with the recesses 2, 2' via ports 18 so that the material admitted at 14 may fill all of the channels and each recess to form an absolutely fluid-tight seal around each bridge 10 and also between the cover 1 and walls 4 and 4'. The material 15 is admitted at such a high pressure that all channels and recesses are completely filled whereby the air escapes along the terminals 5 and into the interior of the housing H or finds other escape routes. It is clear that the cover 1 may be provided with several inlets 14, especially if the channels 19 cannot communicate with the channels 19'. Once the injected material hardens, it is fused with the material of the cover 1 and housing H so that such components form a rigid unit wherein the individual cells are fluid-tightly sealed from each other as well as from the atmosphere and wherein the bridges 10 are fully concealed by insulating material.

It is clear that the ports 18 may be dispensed with and that liquid thermoplastic material may be admitted through suitable inlets provided in the presser plates 12 or through separate inlets formed in the cover 1 and leading to the recesses 2,2'. Also, the material which fills and hardens in the recesses 2, 2' need not be the same material which is injected into the grooves 19, 19'. Furthermore, the filling of channels 19, 19' with liquid thermoplastic material need not occur simultaneously with the filling of recesses 2, 2' with the same or different thermoplastic material. All that counts is to utilize materials which will form satisfactory insulators around the bridges 10 and which will be readily fused with the material of the cover 1 and housing H.

The lips 3d which define between themselves the grooves 3, 3' in the underside of the cover 1 are high enough and sufficiently close to each other to engage the upper edge portions of the walls 4, 4' with at least some friction whereby the cover 1 remains in the position shown in FIGS. 1 to 3 unless and until it is forcibly shifted to the final position of FIGS. 4 and 5. If the bridges 10 should extend to the level of the presser plates 12 shown in FIGS. 4 and 5, the method may include the additional step of forming insulating caps around the top portions of the bridges. Such caps then extend to a level above the upper side of the cover 1. However, whenever the bridges are to be located at a level below the upper side of the cover 1, one preferably proceeds in a manner as described in connection with FIGS. 4 and 5, i.e., the recesses 2, 2' are simply filled with liquid thermoplastic material which is allowed to harden and thereby not only plugs the ports 18 and fills the recesses but also forms an insulating cap around each bridge.

A very important advantage of lips 3d is that they enable the cover 1 and housing H to define properly configurated channels 19, 19' without resorting to special attachments, inserts or other auxiliaries which are hard-to-handle and which must be removed upon completion of the fusing operation. In other words, the parts 1 and H constitute two prefabricated components of a mold whose mold cavities are sealed by injected thermoplastic material whereby the two components form a unitary structure which is properly sealed and insulated in all such zones which require sealing and insulation in the container of an electric storage battery. Furthermore, and as mentioned hereinabove, even in its partially assembled condition, the component or cover 1 forms a mold which can collect surplus molten metal such as might tend to flow into the interior of the housing when the cell connectors 9 are being welded to the corresponding terminals 5 and 5'.

It will be readily understood that the multistage method of my present invention may be practiced with particular advantage in assembling of such structures wherein two or more groups of components must be welded or otherwise connected by different methods and by resorting to different connecting substances. In the illustrated embodiment, the components 1, H consist of synthetic thermoplastic material and are fused to each other by resorting to a liquefied plastic material which is injected through one or more inlets. On the other hand, the components 5, 5' and 9 consist of metallic material (e.g., lead or lead alloy) and must be welded to each other by resorting to a different welding method, i.e., the abutting faces of such components are heated to welding temperature after the cell connectors 9 are placed in proper position. If desired, the terminals 5, and 5' may be connected to each other by pouring charges of molten lead into the recesses 2, 2' while the cover 1 remains in the position of FIGS. 1 to 3. Of course, the ports 18 are then omitted or remain sealed during pouring of molten lead. It is also conceivable to provide strong mechanical connections between the terminals 5, 5' and the cell connectors 9 so that the welding of cell connectors may be dispensed with, and such purely mechanical connections between the metallic parts are then surrounded by insulating material which is poured into the recesses 2, 2' or enters such recesses from the channels 19, 19' via ports 18.

In accordance with heretofore known methods of assembling prefabricated components of an electric storage battery, the forming of connections between the terminals as well as between the housing and cover requires a large number of complicated operations, not only because the components are normally located in different planes but also because the connection between the housing and the cover is of irregular shape. Thus, it is customary to weld the cell connectors in an operation which precedes the welding of the cover to the upstanding walls of the housing, and the resulting bridges are then insulated by thermoplastic material in a further time-consuming operation. Some molten metal invariably finds it way into the interior of the housing unless the clearances around the terminals are sealed by inserts which must be removed upon completion of the welding operation and prior to formation of insulating caps around the bridges. Of course, such inserts occupy space which must be filled with rather expensive insulating material when the inserts are removed, and this not only results in additional expenditures but also in the formation of uneven surfaces which must be made smooth in a further operation.

The cover cannot be finally fused to the housing prior to completion of all current-conducting connections between the adjoining terminals because the bridges 10 must be separated from the interior of cells by layers of insulating material, i.e., by portions of the cover. This accounts for the necessity to complete the formation of bridges 10 prior to permanently securing the cover to the upper edge portions of the housing walls.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be secured by Letters Patent is:

1. A multi-stage method of completing the assembly of an electric multi-cell storage battery of the type wherein a housing consisting of thermoplastic material is provided with upstanding walls defining between themselves a plurality of cells and having edge portions whose upper end faces are provided with elongated grooves adapted to register with complementary grooves at the underside of a thermoplastic apertured cover which is provided with pairs of openings for paired terminals in adjoining cells and whose upper side is provided with recesses adapted to accommodate portions of such paired terminals when the cover abuts against and also when the underside of the cover is slightly spaced from the upper end faces of said walls, comprising the steps of partially assembling the cover with the housing so that the underside of the cover is slightly spaced from said upper end faces whereby portions of said terminals extend through the apertures and into the recesses of said cover and are surrounded by the material of the cover; inserting into each of said recesses a metallic cell connector and welding such cell connectors to the respective terminals to form current-conducting bridges; moving the underside of said cover in actual abutment with said upper end faces so that the registering grooves form elongated channels; injecting into such channels a mass of hardenable liquid material which is fusible with the material of said housing and said cover so as to form an integral sealing connection therebetween; and filling each of said recesses with hardenable liquid insulating material to embed said bridges.

2. A method as set forth in claim 1 for completing the assembly of an electric multi-cell storage battery of the type whose cover is formed with ports providing passages between said channels and said recesses, wherein said injected material is said insulating material and wherein said recesses are filled with material which is admitted into said recesses by flowing from said channels and through said ports.

3. A method as set forth in claim 1, wherein said injected material is identical with said insulating material.

4. A method as set forth in claim 1, wherein said injected and said insulating materials are identical with the material of said housing and said cover.

5. A multi-stage method of completing the assembly of an electric multi-cell storage battery of the type wherein a housing consisting of thermoplastic material is provided with upstanding walls defining between themselves a plurality of cells and having edge portions whose upper end faces are provided with elongated grooves adapted to register with complementary grooves at the underside of a thermoplastic apertured cover which is provided with pairs of openings for paired terminals in adjoining cells and whose upper side is provided with recesses adapted to accommodate portions of such paired terminals when the cover abuts against and also when the underside of the cover is slightly spaced from the upper end faces of said walls, comprising the steps of partially assembling the cover with the housing so that the underside of the cover is slightly spaced from said upper end faces whereby portions of said terminals extend through the apertures and into the recesses of said cover and are surrounded by the material of the cover; inserting into each of said recesses a metallic cell connector and welding such cell connectors to the respective terminals to form current-conducting bridges; moving the underside of said cover in actual abutment with said upper end faces so that the registering grooves form elongated channels; injecting into such channels a mass of hardenable liquid material which is fusible with the material of said housing and said cover so as to form an integral sealing connection therebetween; covering each of said recesses with a presser plate and holding each such plate in sealing abutment with the upper side of said cover; and filling each of said recesses with hardenable liquid insulating material to embed said bridges and to fill each recess so that, upon removal of said presser plates and upon hardening of said insulating material, said cover has a smooth and flat upper side.

6. A method as set forth in claim 5, wherein said side walls define between themselves more than two cells and wherein said mass of hardenable liquid material is injected into said channels through a plurality of inlets provided in said cover.

References Cited
UNITED STATES PATENTS

| | | | |
|---|---|---|---|
| 2,637,758 | 5/1953 | Shannon | 136—176 XR |
| 3,264,141 | 8/1966 | Blaich et al. | 136—134 |

ALLEN B. CURTIS, *Primary Examiner.*

WINSTON A. DOUGLAS, *Examiner.*

D. L. WALTON, *Assistant Examiner.*